March 1, 1955    W. E. WIESENTHAL    2,702,974
FARMING IMPLEMENT
Filed June 10, 1952    3 Sheets-Sheet 1
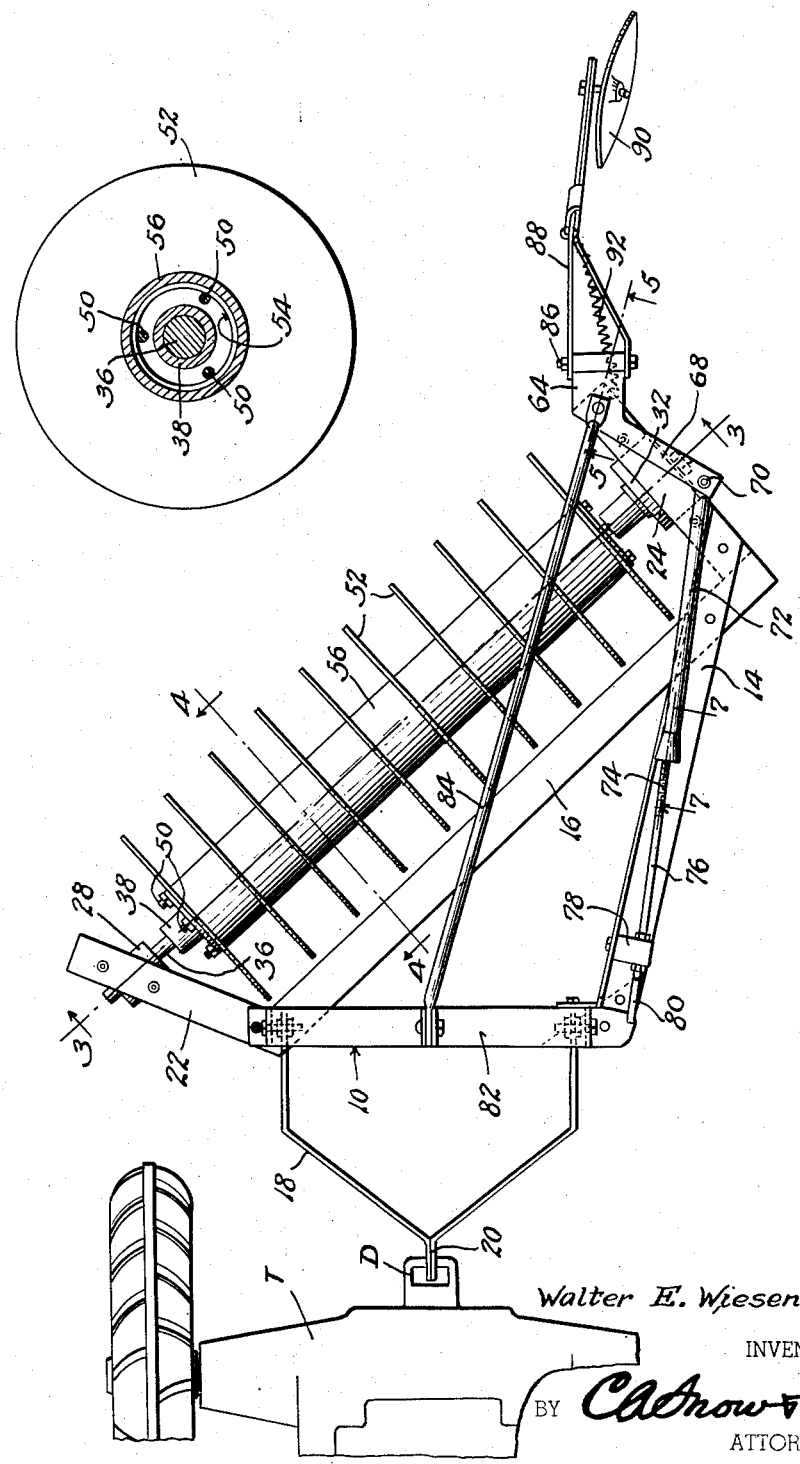
Walter E. Wiesenthal
INVENTOR
BY C.A.Snow & Co.
ATTORNEYS.

March 1, 1955  W. E. WIESENTHAL  2,702,974
FARMING IMPLEMENT
Filed June 10, 1952  3 Sheets-Sheet 2
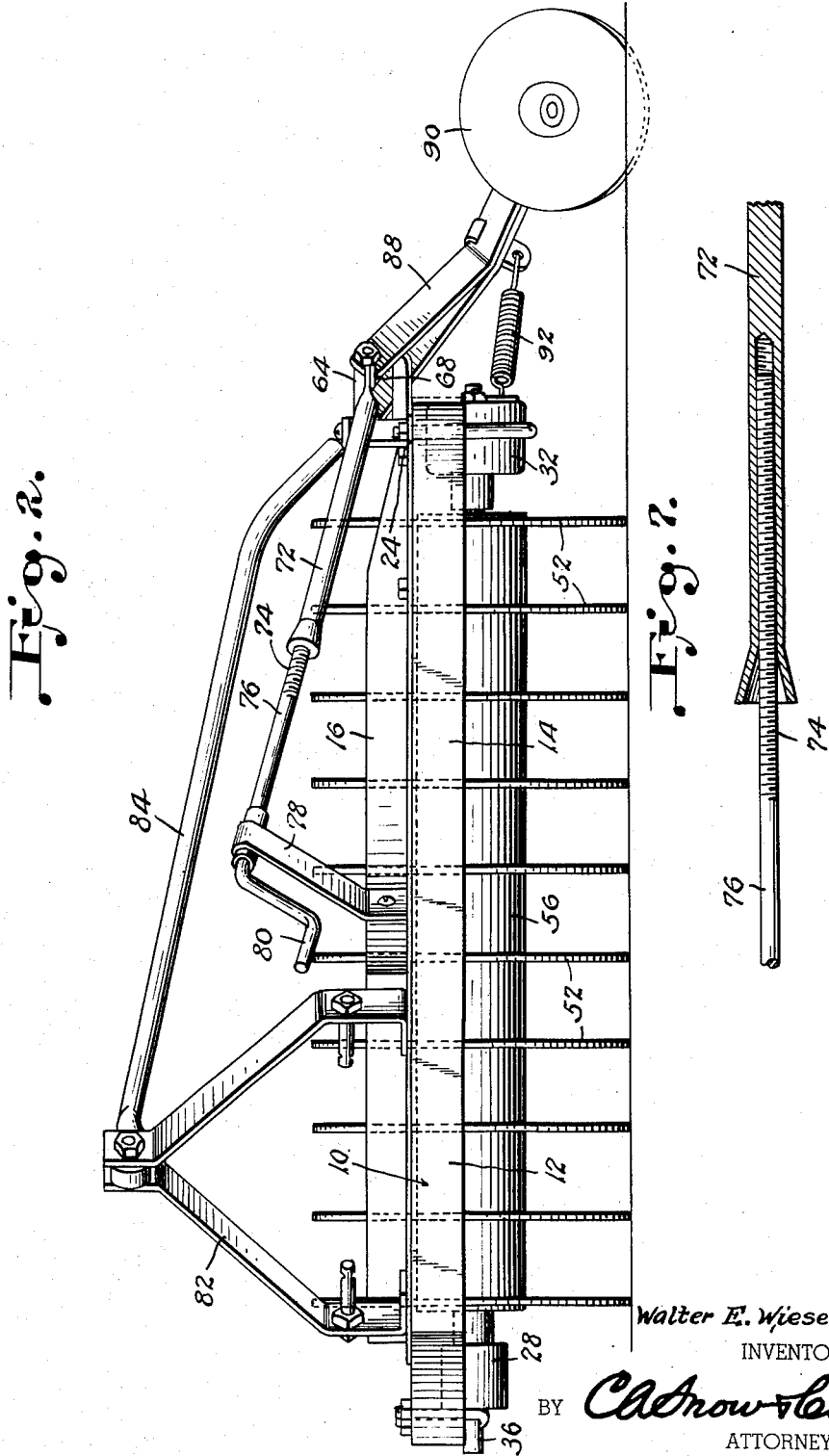
Walter E. Wiesenthal
INVENTOR
BY *C. A. Snow & Co.*
ATTORNEYS.

March 1, 1955 W. E. WIESENTHAL 2,702,974
FARMING IMPLEMENT
Filed June 10, 1952 3 Sheets-Sheet 3
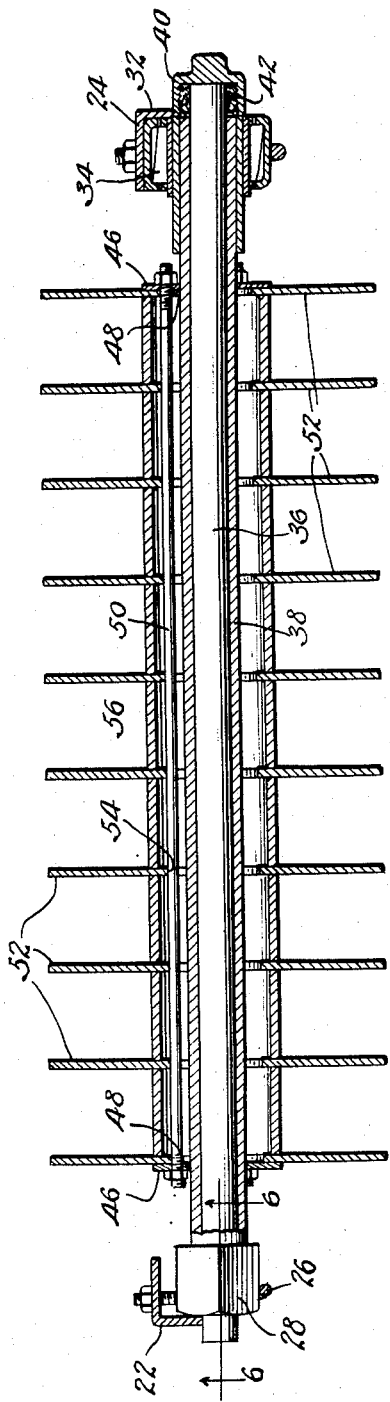
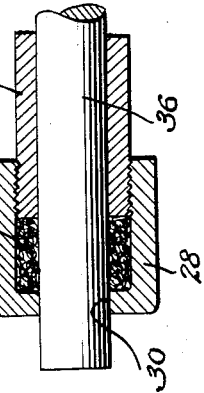
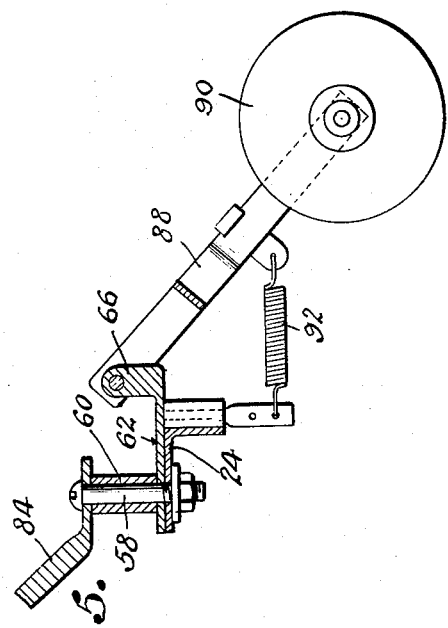
Walter E. Wiesenthal
INVENTOR

United States Patent Office 2,702,974
Patented Mar. 1, 1955

2,702,974

FARMING IMPLEMENT

Walter E. Wiesenthal, Wichita, Kans.

Application June 10, 1952, Serial No. 292,615

1 Claim. (Cl. 55—30)

This invention relates to a farming implement and more particularly to a three point one-way disk harrow.

A primary object of the invention is to work the soil and pulverize it preparatory to planting.

Another object is to relieve the strain on the draw bar of a conventional farm tractor during the harrowing operation and to cause the implement to move in a rectilinear path with the traction vehicle.

The above and other objects may be attained by employing this invention which embodies among its features a frame adapted to be advanced in a rectilinear path, spaced disks mounted on the frame for rotation about a common axis which lies oblique to the rectilinear path, a colter carried by the frame adjacent the rearmost end thereof for movement in a substantially horizontal arcuate path, and means carried by the implement and connected to the colter for moving it in the arcuate path whereby the bite of the colter into the ground will hold the implement in the rectilinear path.

Other features include a bell crank mounted on the frame adjacent the rear end thereof to move about a vertical axis, a yoke pivotally mounted on the bell crank to move about a horizontal axis, a colter carried by the yoke, a retractile coiled spring connected to the frame and to the yoke for urging the colter into the ground, and means carried by the frame and connected to the bell crank for moving the bell crank about the vertical axis to shift the position of the colter with relation to the frame.

In the drawings:

Fig. 1 is a top plan view of a farm implement embodying the features of this invention and showing it connected to a tractor;

Fig. 2 is an oblique view of the implement illustrated in Fig. 1;

Fig. 3 is an enlarged longitudinal sectional view taken substantially on the line 3—3 of Fig. 1;

Fig. 4 is an enlarged transverse sectional view taken substantially on the line 4—4 of Fig. 1;

Fig. 5 is an enlarged fragmentary sectional view taken substantially on the line 5—5 of Fig. 1;

Fig. 6 is a fragmentary enlarged sectional view taken substantially on the line 6—6 of Fig. 3; and Fig. 7 is a fragmentary enlarged sectional view taken substantially on the line 7—7 of Fig. 1.

Referring to the drawings in detail a farming implement designated generally 10 comprises a frame having a front bar 12 carrying adjacent one end a side bar 14, and connected to the front bar 12 and the side bar 14 and extending therebetween is a tie bar 16 which lies oblique to the draft of the implement. Secured to the front bar 12 and extending forwardly therefrom is a suitable coupling yoke 18 carrying a suitable clevis 20 which is adapted to be coupled to the draw bar D of a conventional farm tractor T. The implement is adapted to move in a rectilinear path to the rear of the tractor and the front bar 12 of the frame lies perpendicular to the path of movement when the device is in use.

Carried by and extending outwardly and rearwardly from the front bar adjacent one end thereof is an arm 22 which lies at an obtuse angle to the front bar 12, and carried by the tie bar 16 adjacent the end thereof remote from the arm 22 and extending rearwardly therefrom is an arm 24 which lies perpendicular to the tie bar 16. Supported by a suitable U-bolt 26 on the arm 22 is a suitable cup-shaped bearing 28 having an opening 30 extending through the end wall thereof for the reception of an axle shaft to be more fully hereinafter described. Mounted on the arm 24 in axial alignment with the cup 28 is a housing 32 in which an antifriction roller bearing 34 is supported. An axle shaft 36 extends through the opening 30 in the cup 28 and through the cup and is mounted in the antifriction bearing 34 for rotation about an axis which lies parallel with the tie bar 16. Surrounding the axle shaft 36 and threadedly entering the cup 28 is a sleeve 38 which projects through the bearing 34, and a cap 40 is threadedly engaged with the sleeve 38 adjacent the bearing 34 for retaining a suitable packing 42 about the shaft. A similar packing 44 is contained within the cup 28. Carried by the sleeve 38 adjacent opposite ends thereof are outwardly extending annular flanges 46 which are provided with aligning openings 48 for the reception of through bolts 50 by means of which the harrow disks are clamped in place on the axle shaft 36. The harrow disks 52 are provided with central openings 54 through which the through bolts 50 extend, and disposed between the harrow disks 52 are spacing sleeves 56 which are adapted to hold the disks 52 in longitudinally spaced relation on the shaft 36.

Carried by and extending upwardly from the arm 24 adjacent the rear end thereof is a stud 58 which is surrounded by a suitable spacer sleeve 60 and beneath which is mounted for movement in an arcuate path a bell crank 62 having an arm 64 which extends rearwardly therefrom and carries adjacent opposite side edges upwardly extending ears 66. The opposite arm 68 of the bell crank 62 extends laterally with relation to the arm 64 and has pivotally coupled thereto at 70 a tubular member 72 which extends forwardly with relation to the implement and is threadedly engaged adjacent its forward end with external screw threads 74 carried by a crank shaft 76. This crank shaft is mounted to rotate in a suitable bracket 78 carried by the side bar 14 adjacent the front bar 12 and carried by the crank shaft 76 is a hand crank 80 by means of which the shaft may be turned to advance or retract the sleeve 72 and thereby move the bell crank 62 about the axis of the stud 58. An arch 82 is carried by the front bar 12 and connected to the arch and to the upper end of the stud 58 above the spacer sleeve 60 is a strut 84.

Extending through the ears 66 carried by the arm 64 of the bell crank 62 is a pivot bolt 86 which lies along a horizontal axis and to which is pivotally coupled a yoke 88 carrying a colter 90 which moves in a vertical arcuate path about the horizontal axis of the bolt 86. It will thus be seen that the colter 90 will move in a vertical arcuate path to the rear of the implement. Connected at one end to the arm 24 below the bell crank 62 is a retractile coiled spring 92, the opposite end of which is connected to the yoke 88 adjacent the colter 90. It will thus be seen that the colter will be yieldingly urged to enter the ground being traversed by the implement.

In use the implement is coupled to a conventional tractor T as illustrated in Fig. 1 so that the bar 12 of the implement extends transversely of the path of movement of the implement. By properly adjusting the position of the colter 90 in its horizontal arcuate path, the implement may be held in line with the tractor so that as the tractor moves in a rectilinear path, the implement will also move in a rectilinear path behind the tractor with the disks 52 lying oblique to the rectilinear path. Should the implement tend to move sidewise with relation to the rectilinear path, the colter 90 is adjusted to bring the course of the implement back to that desired much after the operation of the rudder of a ship. It will thus be seen that the implement may be maintained in the desired course throughout its operation.

While in the foregoing there has been shown and described the preferred embodiment of this invention it is to be understood that minor changes in the details of construction combination and arrangement of parts may be resorted to without departing from the spirit and scope of the invention as claimed.

What is claimed is:

A farm implement of the type to be advanced in a rectilinear path, embodying a frame, comprising a tie bar, one end of said tie bar providing a short arm, a rearwardly extended arm formed at the other end of said tie bar, bearings secured to said arms, an axle shaft mounted in said bearings, longitudinally spaced discs carried by said axle shaft for rotation therewith, an elongated front bar extending transversely of the rectilinear path of said implement, said elongated front bar being connected to said short arm, means carried by said front bar and extending forwardly therefrom for connecting said bar to a traction vehicle, a relatively long side bar connected to said front bar at the end thereof remote from said short arm and connected to said rearwardly extended arm of said tie bar, a perpendicular stud rising from said rearwardly extended arm, a bell-crank pivoted to said stud for movement about a vertical axis, a yoke pivotally connected to one arm of said bell-crank to move in a vertical arcuate path to the rear of said perpendicular stud, a colter carried by said yoke to move in a vertical arcuate path to the rear of the implement, a retractile coiled spring carried by the perpendicular stud and connected to said yoke for holding said colter in contact with the ground, an arch carried by and extending upwardly from the front bar, a reinforcing strut connected with said arch and connected to said perpendicular strut holding said strut rigid, and means carried by the side bar and connected to the other end of said arm of the bell-crank for moving the bell-crank about the vertical axis.

References Cited in the file of this patent

UNITED STATES PATENTS

| | | |
|---|---|---|
| 2,038,715 | Chambers | Apr. 28, 1936 |
| 2,322,342 | Bunn | June 22, 1943 |
| 2,467,111 | Coon | Apr. 12, 1949 |
| 2,600,359 | Corviello | June 10, 1952 |
| 2,608,145 | Knapp | Aug. 26, 1952 |
| 2,618,213 | Welcher et al. | Nov. 18, 1952 |

FOREIGN PATENTS

| | | |
|---|---|---|
| 980,890 | France | Jan. 3, 1951 |